US005275684A

United States Patent [19]

Marazzi et al.

[11] Patent Number: 5,275,684

[45] Date of Patent: Jan. 4, 1994

[54] TRANSFER UNIT FOR PRINTING SYSTEMS

[75] Inventors: Luigi Marazzi, Morris Plains, N.J.; Hans Krobath, Lake Ronkonkoma, N.Y.

[73] Assignee: Automated Laser Personalization Systems, Inc., Morris Plains, N.J.

[21] Appl. No.: 777,738

[22] Filed: Oct. 16, 1991

[51] Int. Cl.[5] .................. B32B 31/00

[52] U.S. Cl. .................. 156/359; 156/361; 156/363; 156/540; 156/555; 156/583.1; 100/93 RP

[58] Field of Search .................. 156/540, 582, 541, 542, 156/361, 555, 583.1, 359, 363; 100/93

[56] References Cited

U.S. PATENT DOCUMENTS

| | | | |
|---|---|---|---|
| 4,243,464 | 1/1981 | Potchan et al. | 156/324 |
| 4,261,782 | 4/1981 | Teed | 156/361 |
| 4,387,000 | 6/1983 | Taneradi | 156/495 |
| 4,619,728 | 10/1986 | Brink | 156/555 |
| 4,716,435 | 12/1987 | Wilson | 100/176 X |
| 4,802,949 | 2/1989 | Mitsam | 156/382 |
| 4,886,566 | 12/1989 | Peyre | 156/361 |

*Primary Examiner*—David A. Simmons
*Assistant Examiner*—J. Sells
*Attorney, Agent, or Firm*—Mathews, Woodbridge & Collins

[57] ABSTRACT

A printing system transfer unit includes features which permit it to be coupled to the output sections of a variety of commercially available printing and copying machine. The system transfers thin foils onto printed indicia. The transfer unit has its own self-contained drive mechanism that may be operator adjusted to perform at the proper speed to permit the throughput of the transfer unit to match that of the printer and to minimize paper and foil jams and creases. A sensitive paper sensor is provided for initiating the transfer cycle. The transfer cycle includes the interposition of a transfer sheet and a printer output sheet between a heated roller and a pressure roller to effect transfer. The pressure roller, the transfer sheet and the heater roller are automatically separated from each other and remain in their inactive position, prepared to move into the transfer-cycle position in response to an output signal from the paper sensor.

17 Claims, 17 Drawing Sheets

VCC
P3-1
P3-2
U9A
BUZZER
D7
R28
Q2
R12
U20
U11C
Q1
PRS
R13
C9
R11
U11A
U11B
R16
C14
R27
U10B
R24
D6
R26
R25
R29
R23
U10
R1
R6
RST
D2
D5
R19
R20
U10A
R15
R21
R22
D3
R14
R17
D4
C10
C2
J1-01
J1-09
J1-15
J1-03
J1-04
J1-05

TRANSFER UNIT FOR PRINTING SYSTEMS

BACKGROUND OF THE INVENTION

1. Field of the Invention

The present invention relates to printing systems and, more particularly, to an apparatus for transferring a thin layer of material onto indicia that are printed, copied or otherwise affixed onto the surfaces of sheet-like articles.

2. Description of the Prior Art

The process of applying coatings to printed indicia for the purpose of coloring, decorating, texturizing or otherwise highlighting the indicia is known in the field of printing. One general class of methods commonly used for highlighting such indicia employs a special transfer sheet that includes a transferrable layer of the decorative material and a means, called a transfer unit, to selectively transfer the material onto the indicia. The transfer sheet is usually brought into contact with the indicia while the transfer unit applies heat and pressure, causing the transferrable layer to adhere to the indicia as the layer is released from the transfer sheet. The transferrable layer may be a decorative metallic foil, such as gold or silver as described in U.S. Pat. No. 4,868,049, or it may be a plastic foil, such as mylar or the like. Detailed descriptions of such prior art methods and devices may be found in the following U.S. Pat. Nos. 4,724,026; 3,519,512; 4,866,539; and 4,760,467.

The '026 patent is directed to a process for transferring metallic foil onto a xerographic image. The '512 patent discloses a machine that applies heat and pressure to a transfer sheet for applying designed indicia to articles of various shapes. The '539 and '467 patents disclose computerized foil systems that include a transfer unit mounted at the output of a paper copier or printer. The '049 patent discloses a transfer foil sheet which may be used in the process described in the '026 patent. The transfer units in the '539 and '467 patents include a plurality of rollers that automatically superimpose foil onto indicia-carrying paper. Heat and pressure are applied to the foil by means of a heated solenoid-activated roller to cause the foil to transfer onto the indicia. The foil and material onto which it is transferred are transported through the transfer unit by the interaction of a system of gears.

Although such prior-art printing systems and methods have served the purpose, they have not proved entirely satisfactory under all conditions of service for the reasons that considerable difficulty is often experienced in obtaining a high-quality product in printing systems having a high throughput and prior-art systems have been particularly prone to paper and foil jams and creases. While there is a clear need for improvements in transfer unit technology that improve printing and copying quality, no satisfactory system for doing so has yet been devised. Ideally, such a system would be self contained; would produce a consistent, high-quality product; would have the capability of transferring foil or other transferrable materials at rates equal to or greater than the throughput rates of the printer or copier which it serves; would not cause the paper or foil to jam or crease; would operate dependably with consistent quality and throughput when processing a variety of printed substrates and transfer sheets; would not overheat; would produce little or no electrical interference, noise, or other environmental problems; and would be simple in construction and inexpensive to operate.

SUMMARY OF THE INVENTION

The general purpose of this invention is to provide a transfer unit which embraces all the advantages of similarly employed systems and possesses none of the disadvantages described above. To attain this, the present invention contemplates a unique transfer unit capable of being coupled to the output sections of a variety of commercially available printing and copying systems. The transfer unit will typically replace the transfer units used in the systems described in U.S. Pat. Nos. 4,866,539 and 4,760,467. The transfer unit has its own self-contained drive mechanism that may be operator adjusted to perform at the proper speed to permit the throughput of the transfer unit to match that of the printer and minimize jams and creases. The transfer cycle is initiated by the output of the printer and the process is controlled by a microprocessor-based controller. The transfer cycle includes the superposition of a foil transfer sheet onto a printer output sheet between a heated roller and a pressure roller to effect transfer of the foil on the transfer sheet onto the printer output sheet. This is effected by bringing the heated roller and the pressure roller together by means of a specially designed motorized lever mechanism. When there is no printer output, the pressure roller and the transfer sheet are automatically separated from the heater roller into an inactive position.

The exact nature and many of the attendant advantages of the invention will be readily appreciated as the same becomes better understood by reference to the following detailed description when considered in connection with the accompanying drawings. In the detailed description and drawings, like reference numerals designate like parts throughout the figures thereof. For clarity some of the parts are either cut away or not included in every view of the invention.

DETAILED DESCRIPTION OF THE PREFERRED EMBODIMENT

Figure 9:
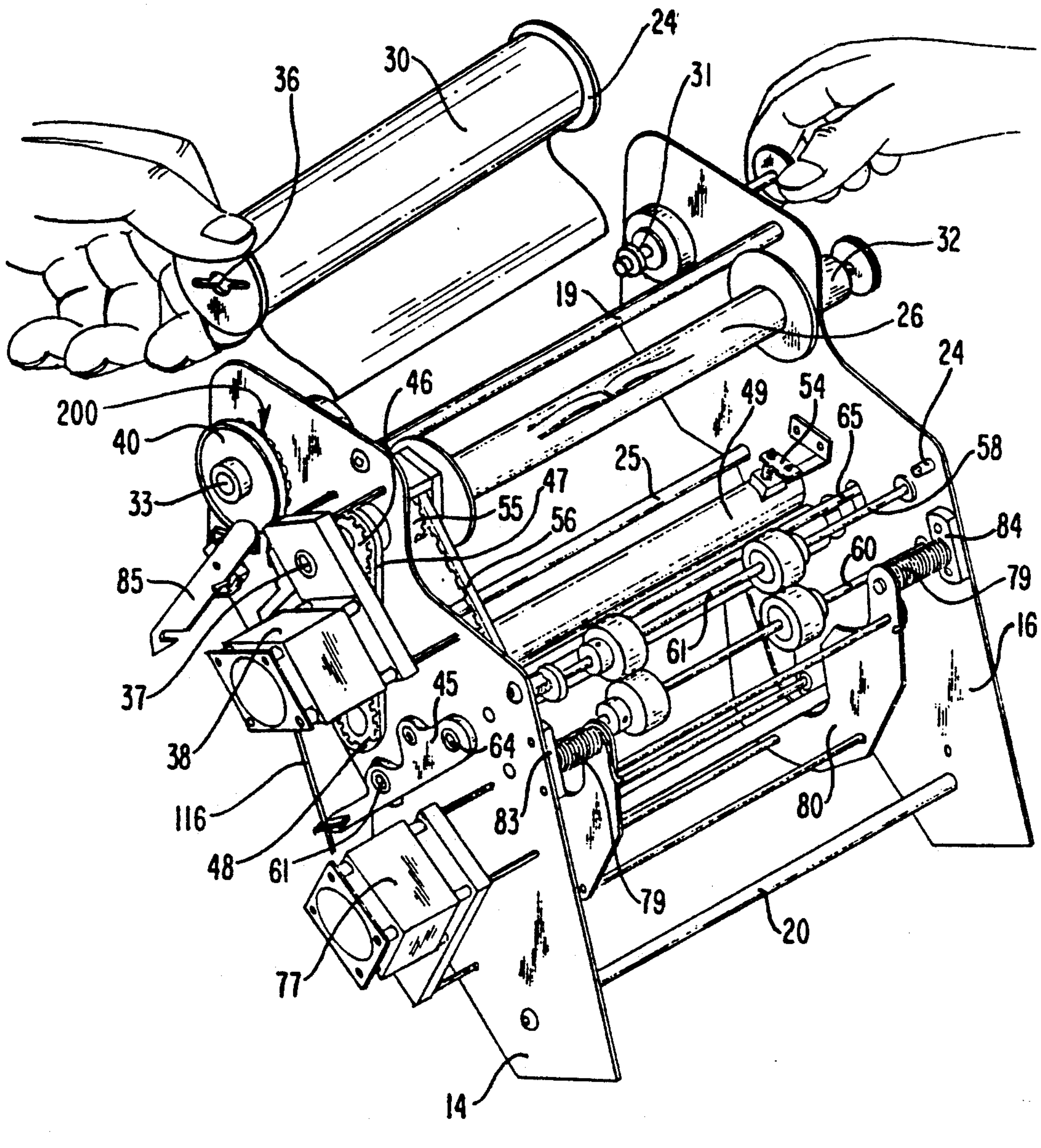
FIG. 9 is a perspective view similar to the view of FIG. 2 illustrating how a user would operate a portion of the invention.

Referring now to the drawings, there is shown a transfer unit 10 having a frame 12 made up of parallel end plates 14, 16 supported and spaced by support rods 18–25. A foil supply roller 24 and a foil take-up roller 26 are mounted between plates 14 and 16 near the top of the unit 10. A roll of foil transfer sheet 30 (FIG. 9) is mounted on the foil supply roller 24. The end of sheet 30 is threaded through the unit 10 (FIG. 10) from foil supply roller 24 to foil take-up roller 26.

Figure 8:
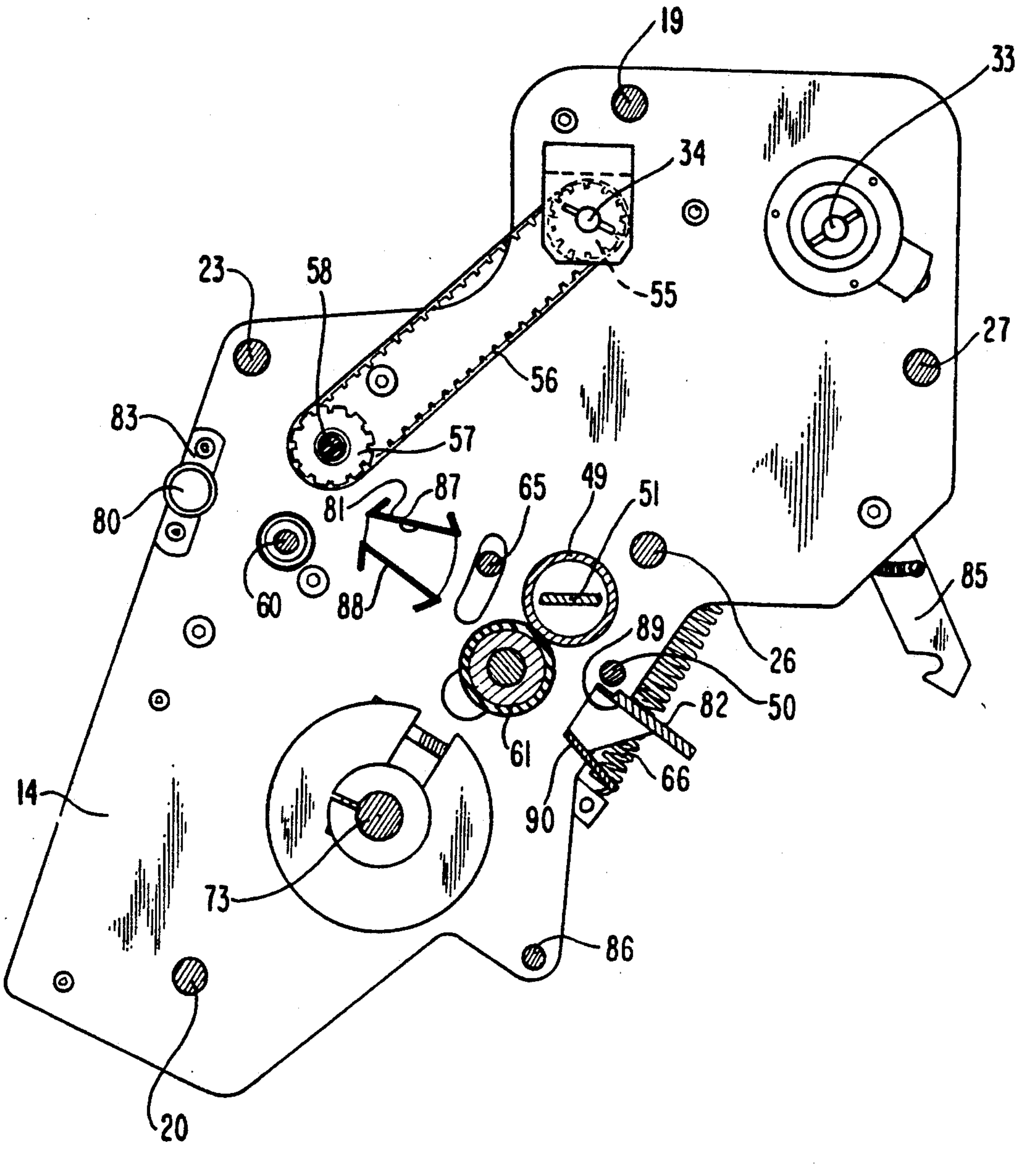
FIG. 8 is a sectional view taken on the line 8—8 of FIG. 3 looking in the direction of the arrows.

Spring-loaded plungers 31, 32 are mounted on plate 16 for removably engaging one end of the rollers 24 and 26, respectively. A slot 36 (FIG. 9) on the other end of roller 24 engages a rotatable pinned idler axle 33 (FIG. 8). A pinned drive axle 34 mates with one end of roller 26 which has a slot similar to slot 36 of roller 24. Rollers 24 and 26 are of identical structure.

Figure 1:
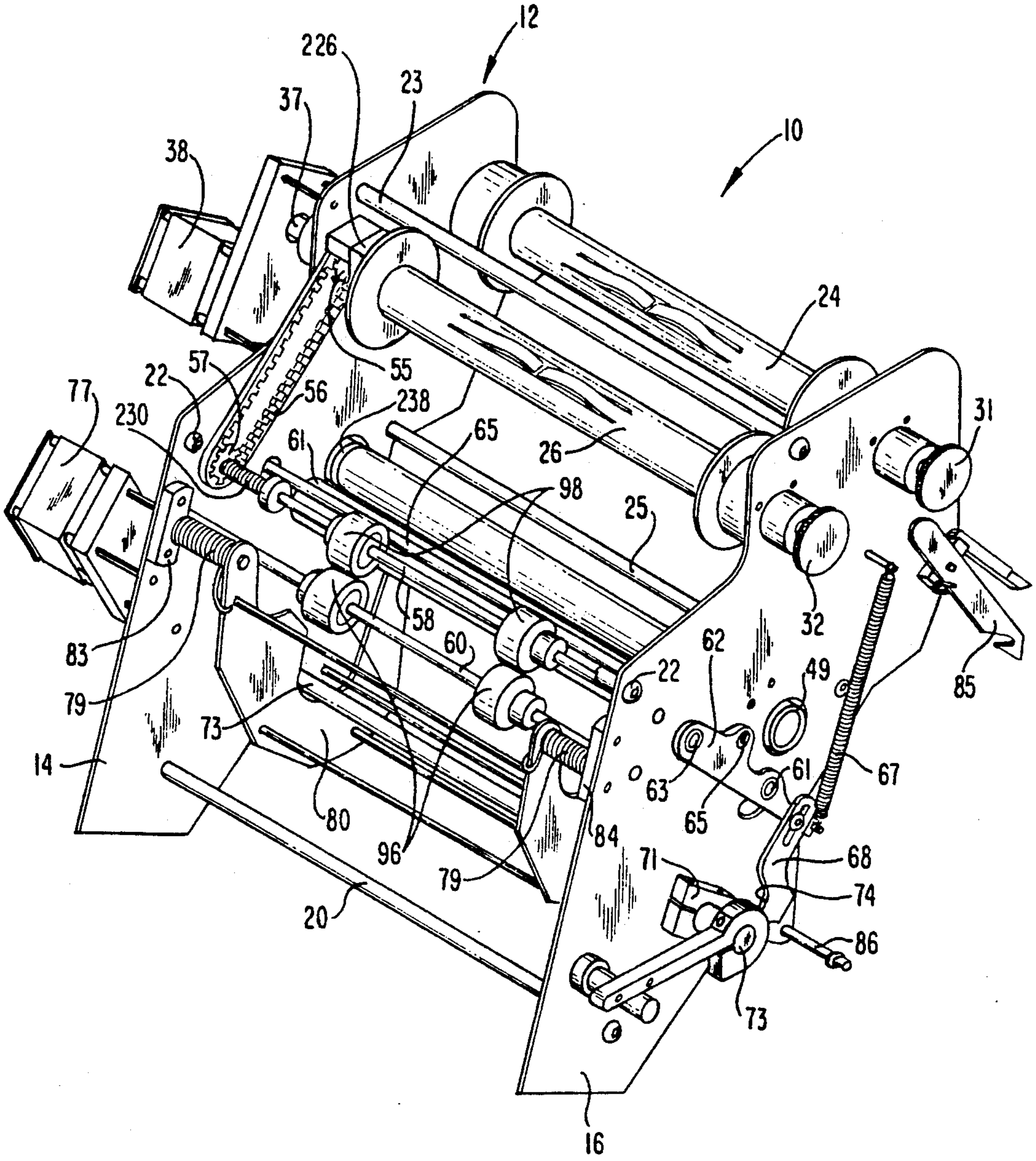
FIG. 1 is a right-side perspective view of the preferred embodiment of the invention.
Figure 10:
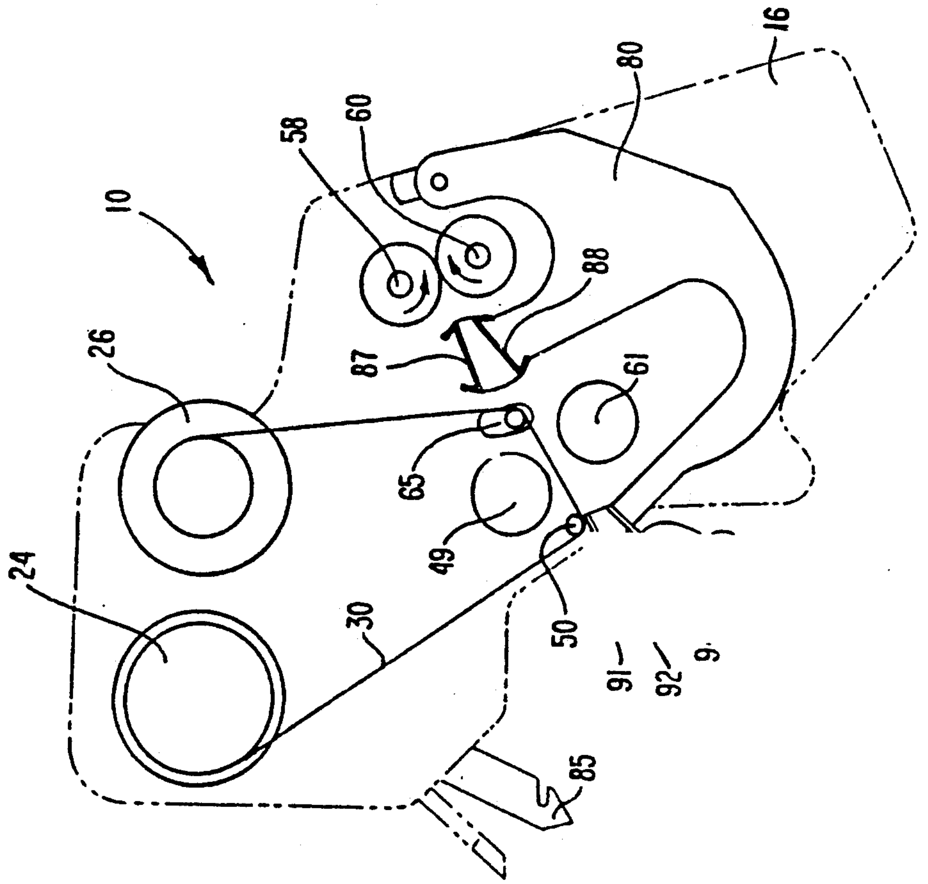

Axle 34 is coupled to the output drive shaft 37 of an electric motor 38 (FIG. 1). The take-up roller 26, when driven by motor 38, pulls sheet 30 from roller 24 through the unit 10 onto roller 26 (FIG. 10).

Figure 5:
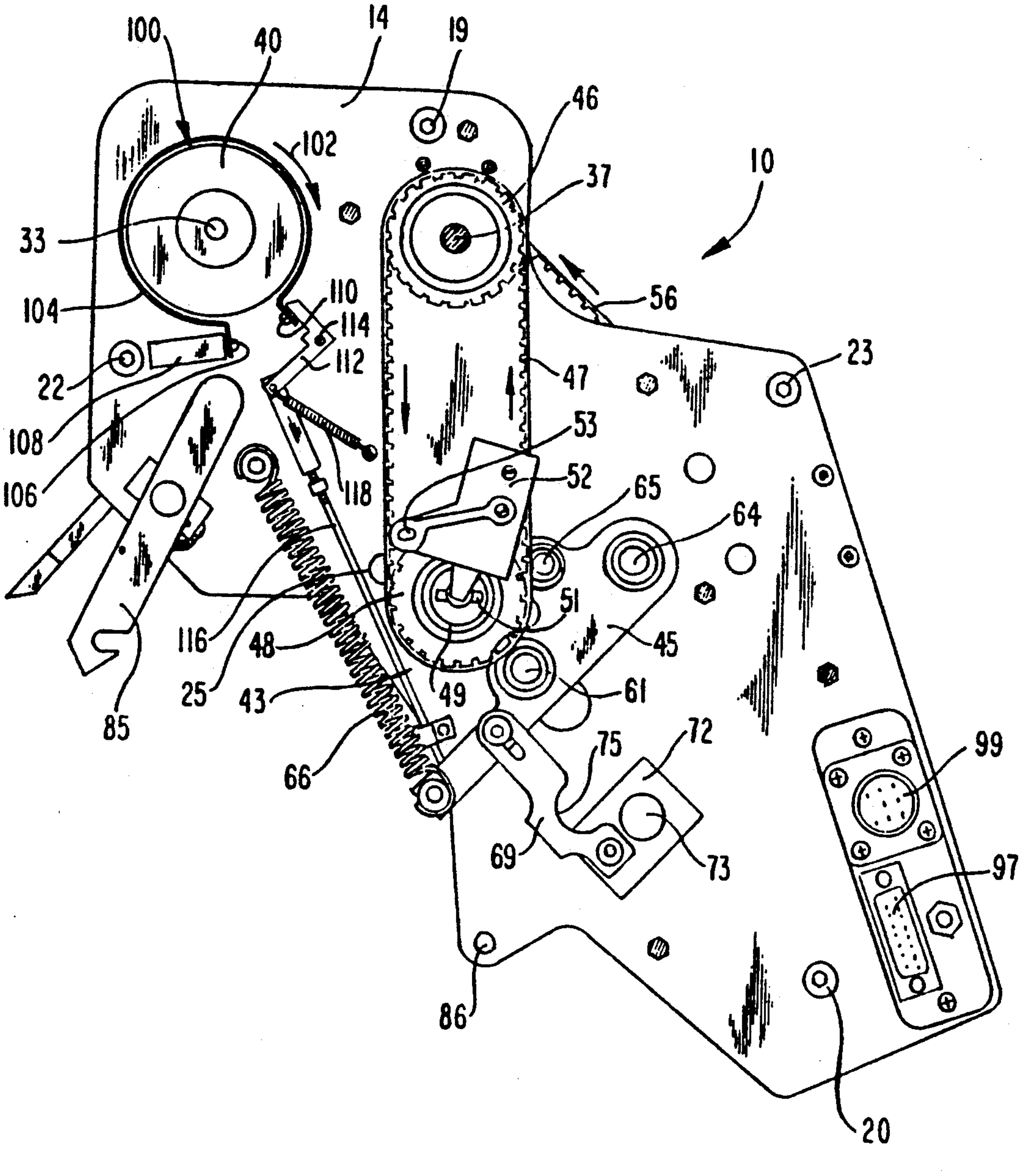
FIG. 5 is a sectional view taken on the line 5—5 of FIG. 3 looking in the direction of the arrows.
Figure 16:
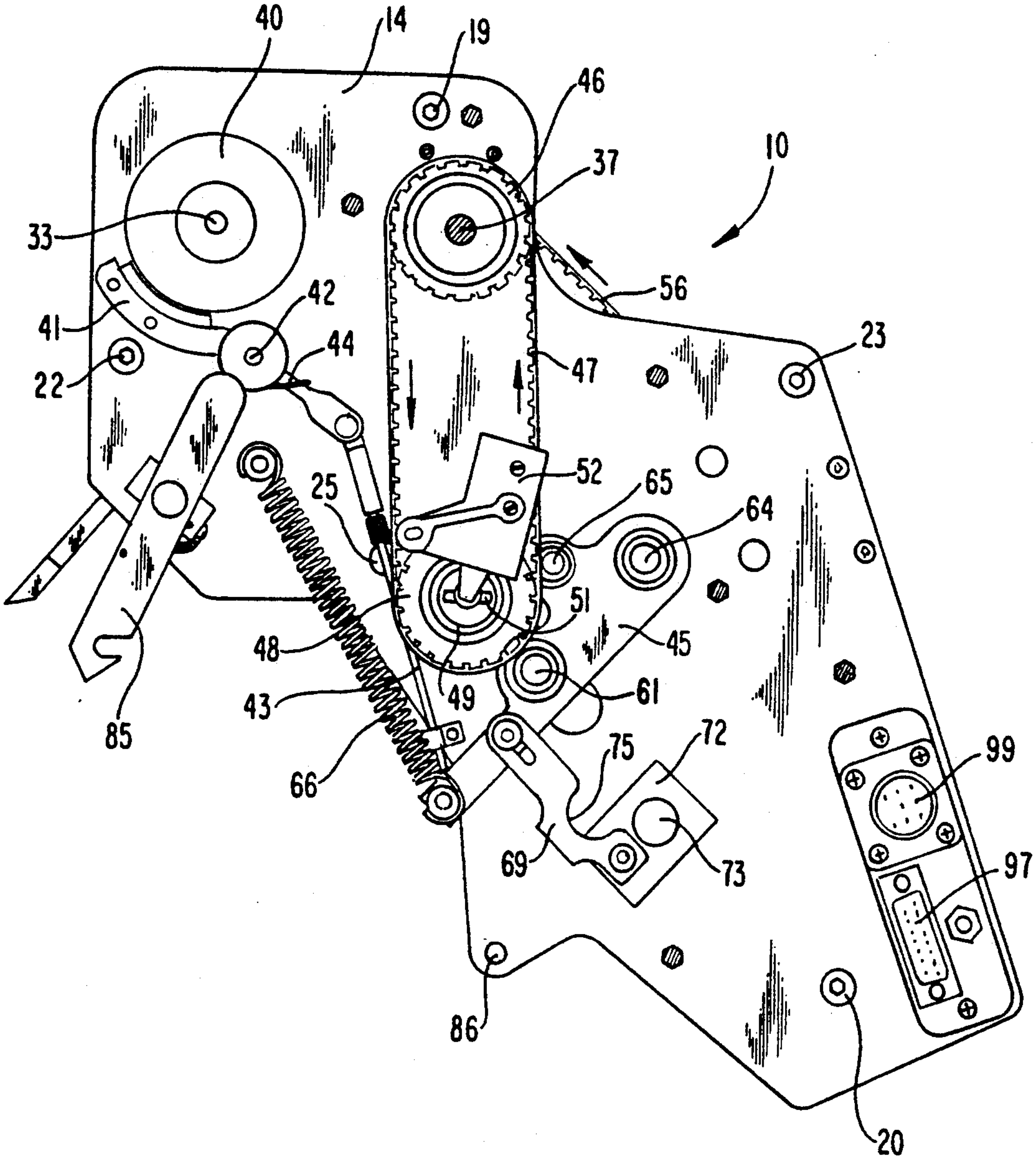
FIG. 16 is a detailed illustration of an alternative embodiment of the foil take-up braking mechanism.

As shown in FIG. 5, axle 33 is coupled to a brake drum 100 that cooperates with a brake mechanism 102. In the preferred embodiment, brake drum 100 is substantially surrounded by metal band 104. One end 106 of metal band 104 is fixed onto band attachment block 108 which is in turn fixed to end plate 14. The other end 110 of metal band 104 is attached to brake release lever 112 which is pivoted at pivot point 114 attached to end plate 14. The other end of brake release lever 112 is pivotally connected to brake activation rod 116 and brake spring 118. Brake activation rod 116 abuts lever 45 in such a way that the position of pressure roller 61 is communicated via brake activation rod 116 to metal band 104. When pressure roller 61 is in the open position, metal band 104 tightly clamps around brake drum 100 and the foil supply roller 24 cannot turn. When pressure roller 61 is in the closed position, metal band 104 is released and foil supply roller 24 can turn. An alternative embodiment of the brake mechanism shown in FIG. 16 comprises a brake shoe mechanism which is pivotably mounted on plate 21 by a pivot pin 42. Coil spring 44 is mounted on pin 42 and has an arm that biases the shoe 41 into engagement with drum 40. An adjustable arm 43 is designed to push the shoe 41 out of engagement with the shoe 40. Arm 43 rests against and is controlled by the lower end of a lever 45 in a manner shown in FIG. 16.

Figure 15A:
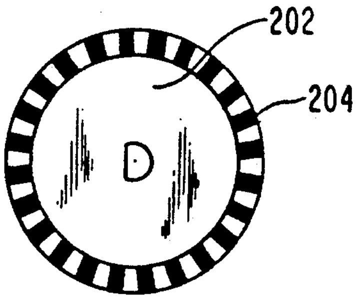
FIGS. 15A-B are detailed illustrations of the sensor wheel of the foil sensing device.
Figure 15B:
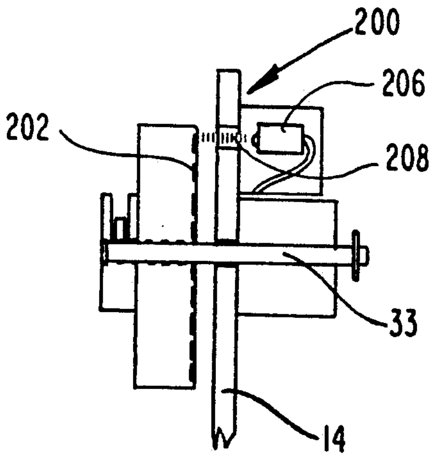

A foil sensing device 200 illustrated in FIGS. 15A–B is provided to detect when the foil supply roller 24 has run out of foil. The device comprises a sensor wheel 202 located on the surface of brake drum 100 between brake drum 100 and end plate 14. The foil sensor wheel 202 has index markings 204 on its periphery. An optical sensor 206 detects the motion of these markings through a hole 208 in end plate 14 when brake drum 100 turns during the printing process. If the foil on foil supply roller 24 runs out, brake drum 100 will stop turning and the optical sensor 206 will generate an out of foil signal which is sent to controller 300.

The torque on foil take-up roller 26 is controlled by clutch 226. Controlling the torque on foil take-up roller 26 controls the force with which transfer sheet 30 is pulled through rollers 49 and 61. Correct adjustment of the torque on foil take-up roller 26 minimizes the risk that brake mechanism 102 will be overcome by too much torque on foil take-up roller 26, causing transfer sheet 30 to pass through the transfer unit 10 when it is not required to do so. It also minimizes the risk of paper and transfer sheet jams (caused by too little torque on foil take-up roller 26). The construction and operation of clutch 226 are substantially identical to that of the generalized clutch 250 shown in FIG. 18 (described below) and clutch 226 is adjusted in the same way. The torque on foil supply roller 24 is also adjustable by means of clutch 224 which also controls the force with which transfer sheet 30 is pulled through rollers 49 and 61. Correct adjustment of clutch 224 also minimizes the risk of transfer sheet jams, as well as creasing of the transfer sheet 30, and slippage of the brake mechanism 102 when no foil is required. The construction and operation of clutch 224 are substantially identical to that of generalized clutch 250 shown in FIG. 18 and described below. In order to minimize paper jams at the output of the transfer unit 10, the torque exerted by motor 38 on outfeed shaft 58 is adjustable by means of tensioner 230. Tensioner 230 comprises a shaft collar 232, a tension spring 234 which are all carried by outfeed shaft 58. Tension spring 234 abuts gear 57. The torque on outfeed shaft 58 is adjusted by compressing or relaxing tension spring 234 by sliding shaft collar 232 towards or away from gear 57 along outfeed shaft 58.

Figure 2:
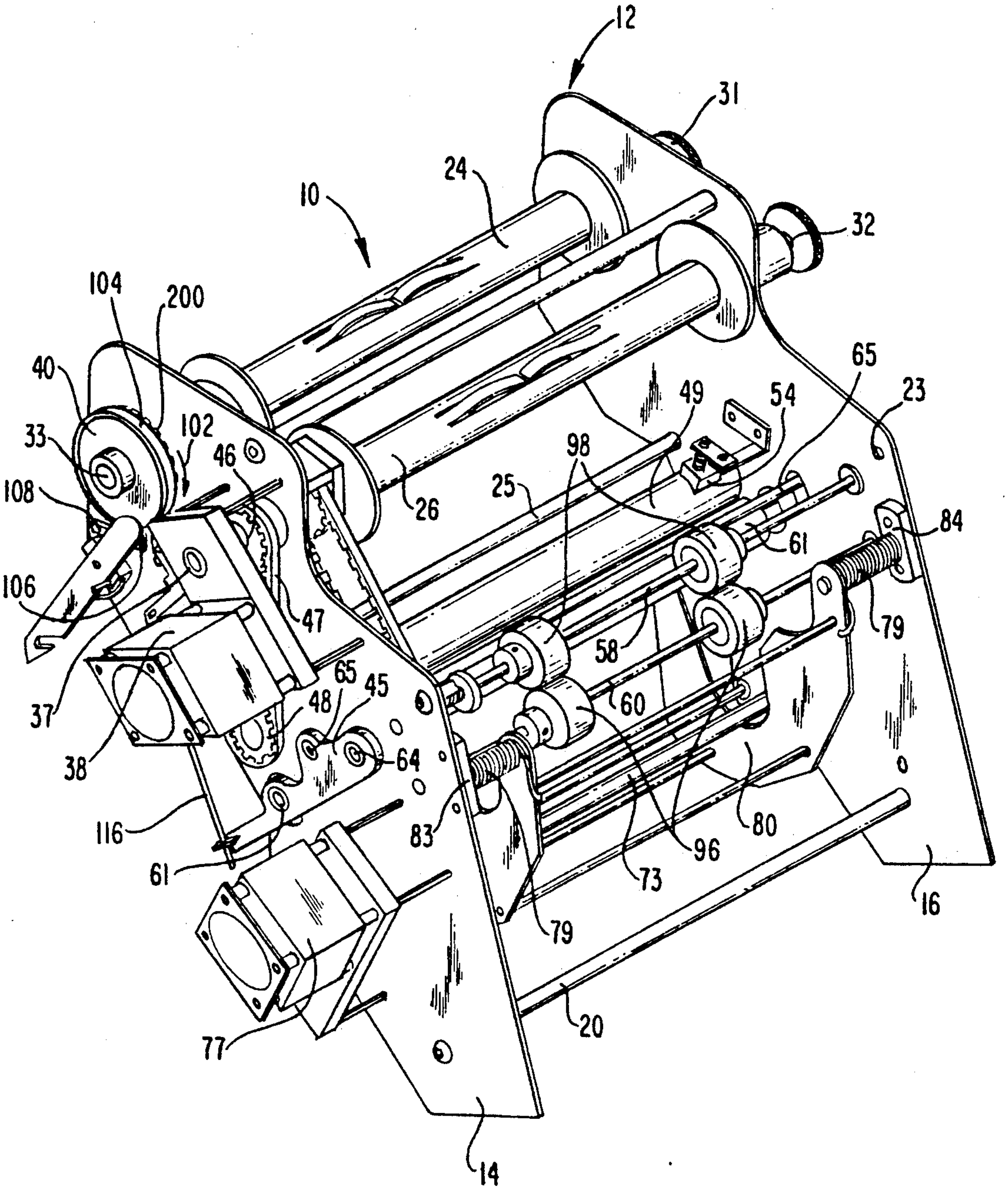
FIG. 2 is a left-side perspective view of the device shown in FIG. 1.
Figure 3:
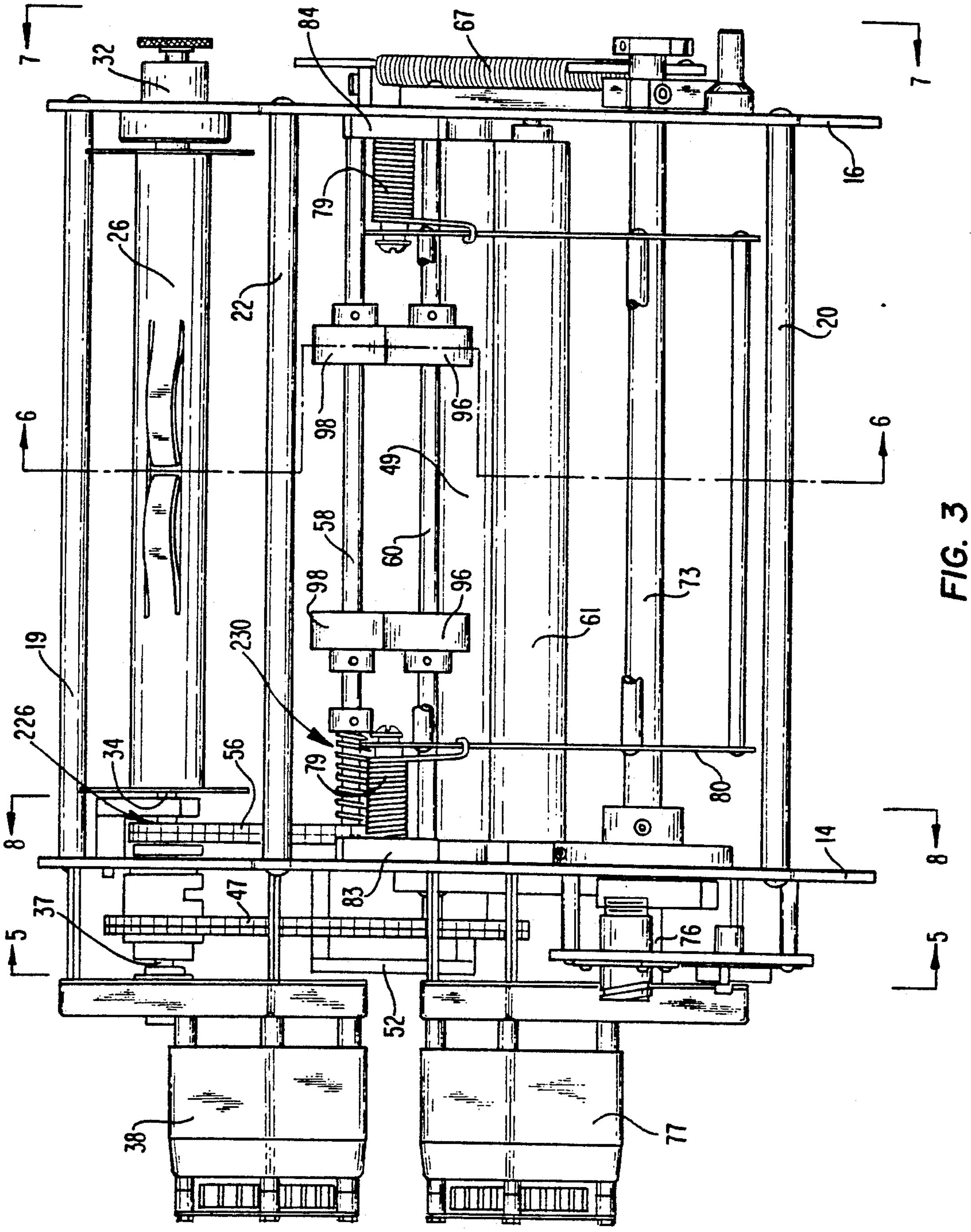
FIG. 3 is a front elevation of the device shown in FIGS. 1-2.

Drive shaft 37 (FIG. 2) operates a drive gear 46 for driving a belt 47 which in turn drives a roller gear 48. Gear 48 is coupled to a heater roller 49 that is mounted between plates 14 and 16 so that heater roller 49 rotates with gear 48. The torque applied to heater roller 49 is controlled by clutch 238 (FIG. 1). By controlling the torque applied to heater roller 49, paper and foil jams can be minimized. Clutch 238 is substantially identical to generalized clutch 250 shown in FIG. 18 (described below) and functions in the same way.

Figure 18:
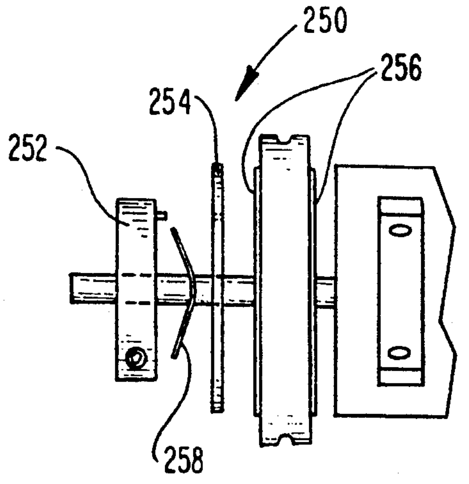
FIG. 18 is a detailed partially exploded illustration of the clutch mechanism used for regulating the torque in various parts of the device.

FIG. 18 shows a generalized clutch 250 used to implement clutches 224, 226 and 238. Clutch 250 comprises a shaft collar 252, a pressure plate 254 and friction surfaces 256. A spring washer 258 is interposed between shaft collar 252 and pressure plate 254. The torque is adjusted by adjusting the pressure exerted on pressure plate 254 by spring washer 258 by loosening set screw 262 and moving shaft collar 252 towards or away from friction surfaces 256 along shaft 260.

Figure 4:
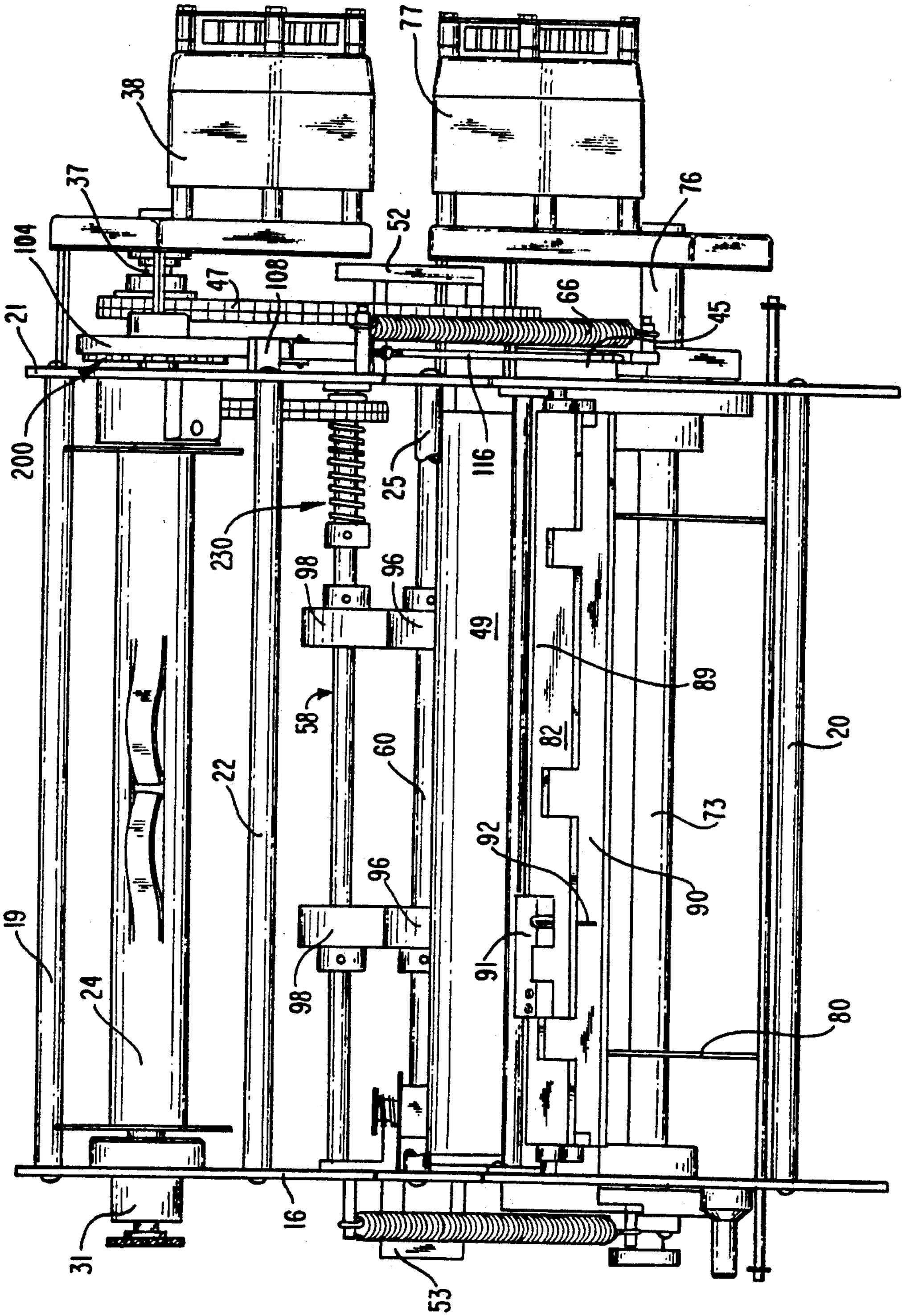
FIG. 4 is a rear elevation of the device shown in FIGS. 1-3.
Figure 6:
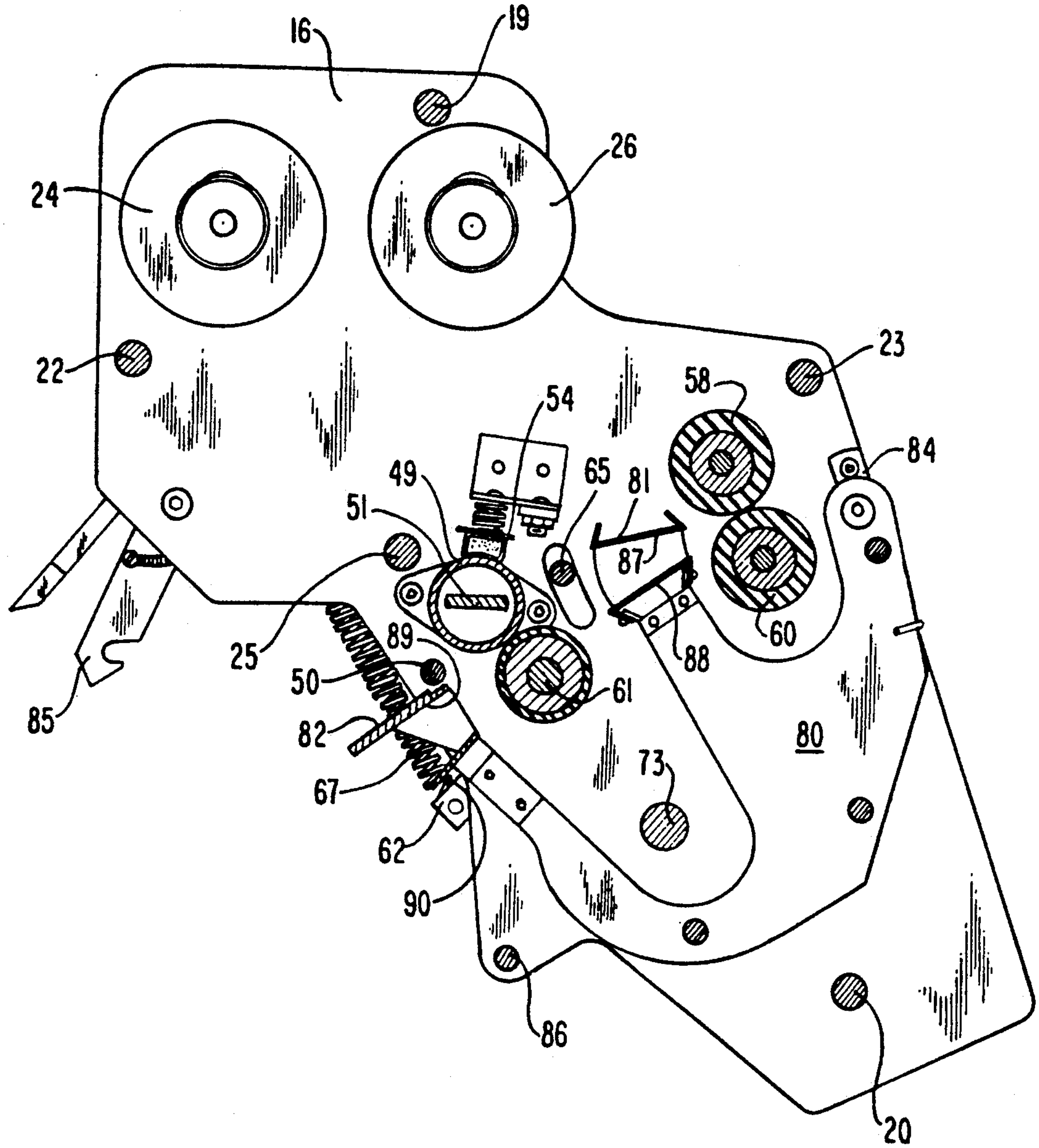
FIG. 6 is a sectional view taken on the line 6—6 of FIG. 3 looking in the direction of the arrows.
Figure 7:
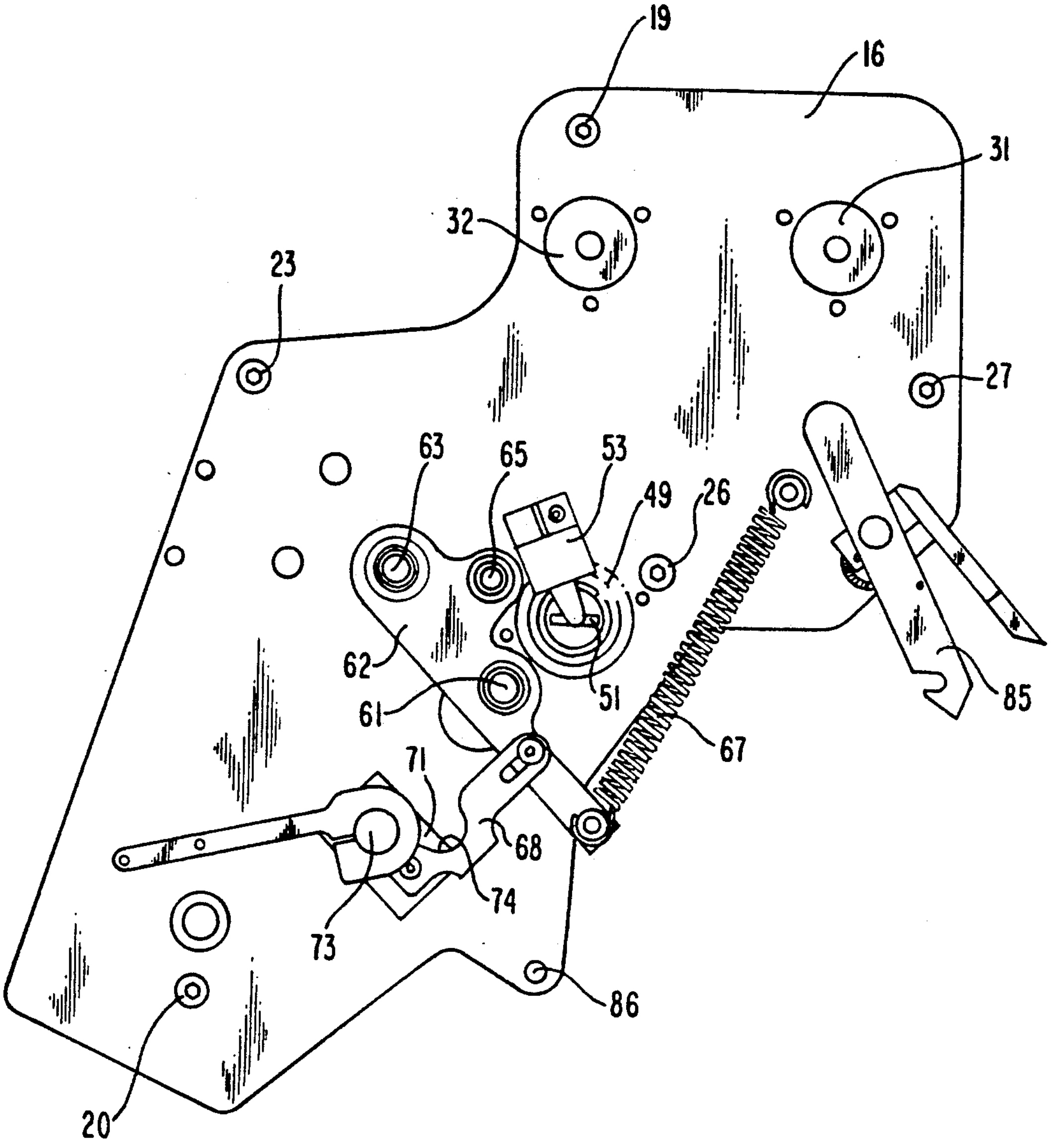
FIG. 7 is a right-side end elevation of the preferred embodiment of the invention.

Roller 49 is hollow and houses a heater element 51 that extends the length of roller 49 (FIGS. 5, 6). Heater element 51 is able to heat roller 49 to a temperature of up to at least 180° C. and normally operates at 150° C. Element 51 is fixed in place by insulating terminals 52, 53 that are mounted on plates 14 and 16, respectively (FIGS. 4, 5, 7). A temperature detector 54 (FIG. 6), such as a conventional thermocouple, is mounted on plate 16 in sliding contact with the surface of heater roller 49. The temperature of heater element 51 is controlled by controller 300 by means of a feedback loop between temperature detector 54, controller 300 and element 51.

A second drive gear 55 is fixed on shaft 34 for driving a belt 56 that is coupled to a roller gear 57 (FIG. 8). Gear 57 is joined to outfeed shaft 58 of a first pair of outfeed rollers. Outfeed shaft 58 carrying outfeed rollers 98 is mounted in bearings fixed to plates 14 and 16. A second pair of outfeed rollers 96 are mounted on outfeed shaft 60 that is rotatably mounted between plates 14 and 16 such that the outfeed rollers 96 and 98 will mate in rolling contact.

Figure 17A:
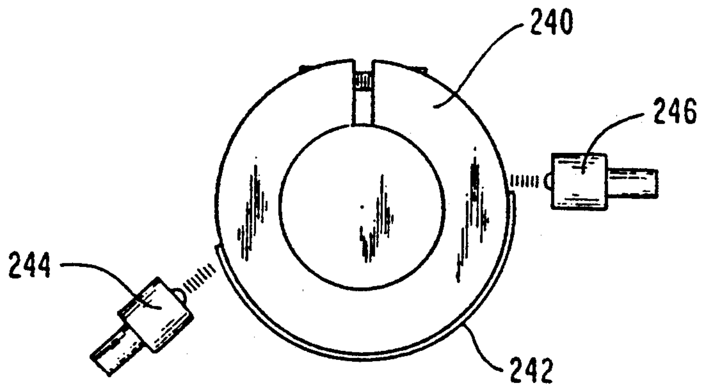
FIGS. 17A–B are detailed illustrations of the open/-close indicator.
Figure 17B:
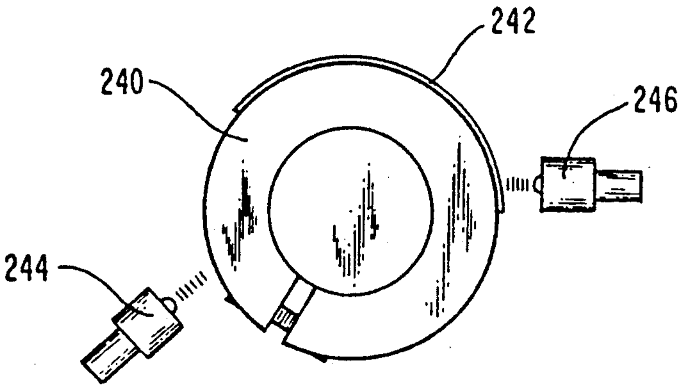

A pressure roller 61 having a flexible surface, is rotatably mounted at either end of spring-biased levers 45 and 62. Lever 62 (FIG. 7) is pivoted on plate 14 about axle 63. Lever 45 (FIG. 5) is pivoted on plate 14 about axle 64. A spacing roller 65 is rotatably mounted at either end of levers 45 and 62. Means are provided for detecting whether pressure roller 61 is in the "open" or "closed" position. Open-close detector 238 is illustrated in FIGS. 17A–B. Pressure roller 61 is in the "closed" position during the printing cycle as described below and is in the "open" position at all other times. Pressure roller 61 is mounted between levers 45 and 62 which are in turn mounted on shaft 73 which is driven by motor 77 and drives levers 45 and 62. Shaft 73 is equipped with collar 240 at one of its ends on the inside of end plate 14. Collar 240 has foil 242 covering approximately ⅓ of the circumferential surface of collar 240. An "open" sensor 244 is mounted on a collar which is in turn mounted on end plate 14 to detect the presence of foil 242. A "close" sensor 246 is mounted on the collar on end plate 14 approximately 120° away from "open" sensor 244 to detect the presence of foil 242. When pressure roller 61 is in the "open" position, foil 242 will be oriented in such a position that "close" 246 sensor will detect its presence and send a signal to controller 300 to move the pressure roller 61 into the "closed" position. When pressure roller 61 is in the "closed" position, "open" sensor 244 will detect the presence of foil 242 and send a signal to controller 300 to move pressure roller 61 into the "open" position.

One end of lever 45 is biased by a coil spring 66 that is joined via a post to plate 16. Similarly, one end of lever 62 is biased by coil spring 66 that is joined via a port to plate 14. Slots are formed in the plates 14 and 16 to permit the ends of rollers 61 and 65 to move under the influence of levers 45 and 62. A slotted arm 68 (FIG. 7) is slidably coupled at one end to lever 62 and is pivoted at its other end to a block 71 that is fixed to one end of an axle 73. A slotted arm 69 (FIG. 5) is slidably coupled at one end to the lever 45 and is pivoted at its other end to a block 72 that is fixed to the other end of the axle 73. The arms 68, 69 have C-shaped sections 74, 75, respectively, for over-the-center cooperation with the axle 73 for a purpose that will be made clear below. Axle 73 is directly coupled to drive shaft 76 of motor 77.

Mounting latches 85 and mounting pin 86 are provided for mounting the unit 10, in a conventional manner, to the output of a copier machine or laser printer.

A cradle-shaped guiding bracket 80 has a front guide 81 and a rear guide 82. The bracket 80 is pivoted in fixed bearing blocks 83, 84 that are fixed to plates 21, 22, respectively. The bracket 80 is biased by springs 79 into the position shown in FIG. 1.

Rear guide 82 has an upper plate 89 and a lower plate 90 for forming a generally funnel-shape slot for guiding paper 93 (FIG. 11) into the unit into engagement with the transfer sheet 30 and the pressure roller 61. Guide 81 has an upper plate 87 and a lower plate 88 forming a generally funnel-shaped slot for guiding paper discharged by rollers 49, 61 into engagement with pull rollers 58, 60.

Figure 11:
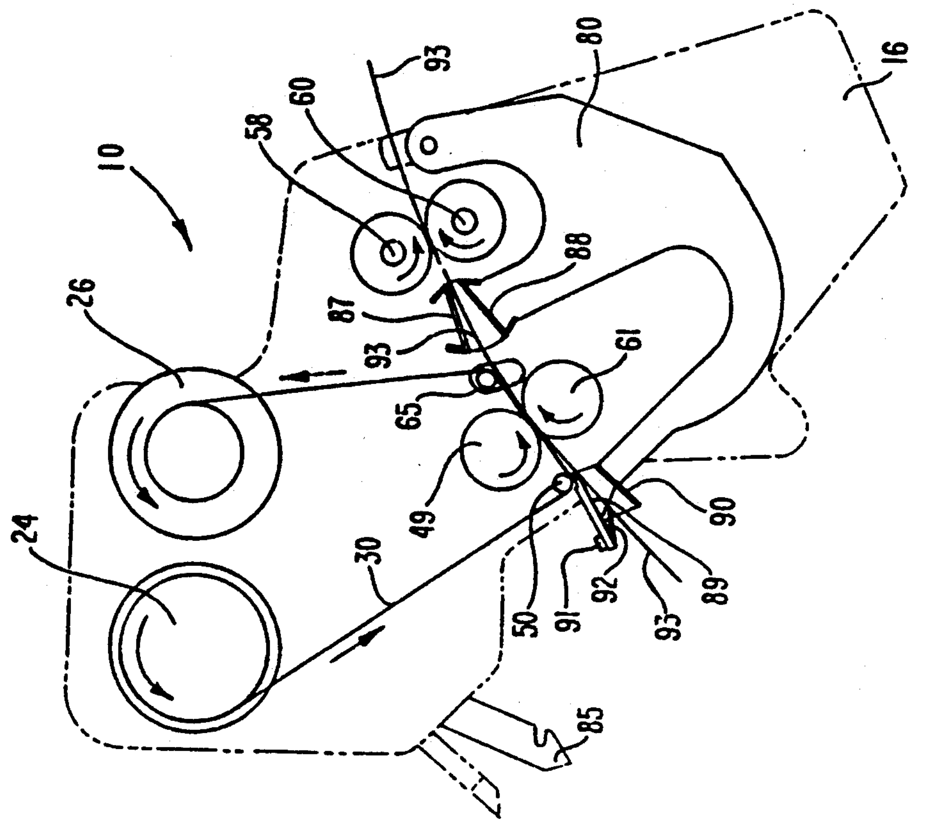
FIGS. 10-12 are diagrammatic views similar to the view shown in FIG. 6.
Figure 14A:
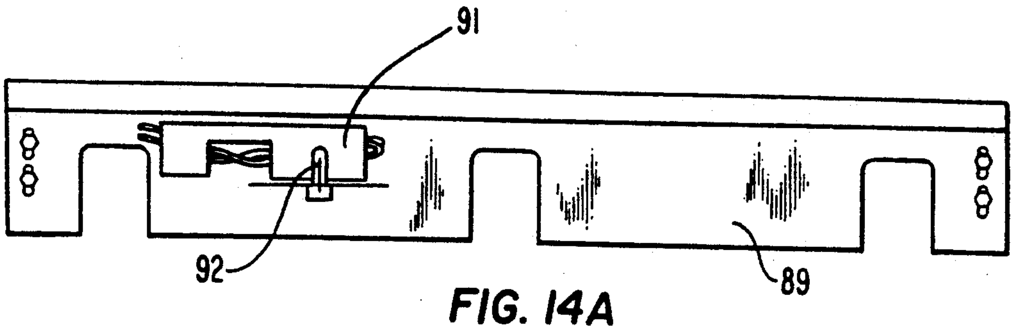
FIGS. 14A-C are detailed illustrations of the paper sensor which activates the unit.
Figure 14B:
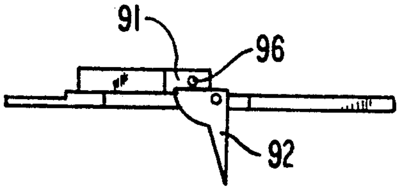
Figure 14C:
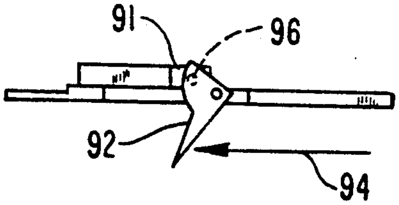

Paper sensing device 91 is mounted on upper plate 89 of front guide 81. FIGS. 14A–C illustrate the preferred embodiment of the paper sensing device 91. A paper input sensor 91, mounted on plate 89, has an arm 92 that hangs like a pendulum and points generally towards plate 90 when it is in its rest position. The paper input sensor 91 is designed to produce an electric output pulse when the arm 92 is rotated, as shown in FIG. 11 and FIG. 14C, out of its rest position (FIG. 10). The arm 92, when rotated by a piece of paper 93 or other material which is fed through the system, makes or breaks an electric circuit by blocking or exposing a light beam emitted by light emitting diode. The input sensor 91 can also be implemented by other means known to those of skill in the art such as a micro-switch.

The operation of the unit 10 will be described with particular reference to FIGS. 10–14 and general reference to the FIGS. 1–9 and 15–17. Unit 10 is controlled by controller 300 which relays control signals to unit 10 via data cable jack 97 and signal cable jack 99. FIG. 10 illustrates the unit 120 in the ready position, showing the sheet 30 threaded through the mechanism. Sheet 30 extends from the supply roller 248, around roller 50, between heater roller 49 and pressure roller 61, around roller 65, and up to take-up roller 26. Under the control of motor 38, the take-up roller 26 would pull the transfer sheet 30 through the mechanism. However, when in the ready position, pressure roller 61 is in the open position and the foil supply roller 24 is therefore looked by brake mechanism 102. Also while in the ready position, the transfer sheet 30 is spaced from heater roller 49 (FIG. 10) by movable spacing roller 65 to prevent heat damage to the sheet 30. The guide plates 87–90 are aligned to straddle a path that extends generally from the point where rollers 49 and 61 meet and rollers 60 and 58 meet (FIG. 11). In this position, the paper sensor arm 92 extends downwardly from plate 89 into close proximity with plate 90.

Figure 13:
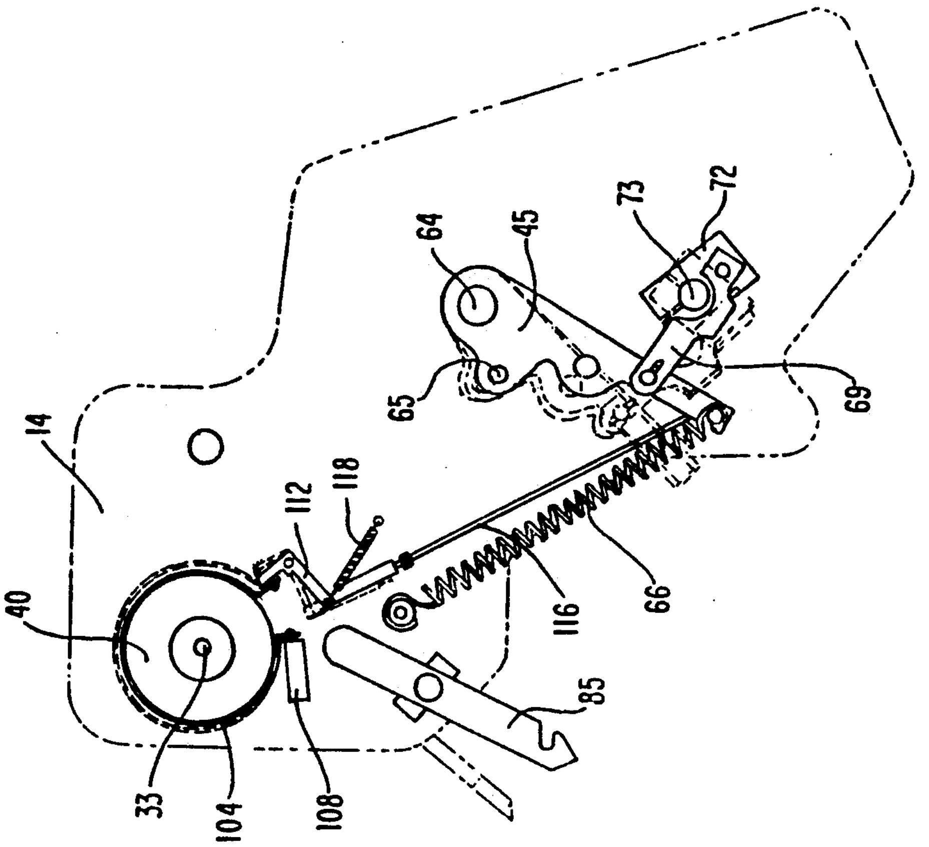
FIG. 13 is a left-side elevation of the preferred embodiment of the invention.
Figure 12:
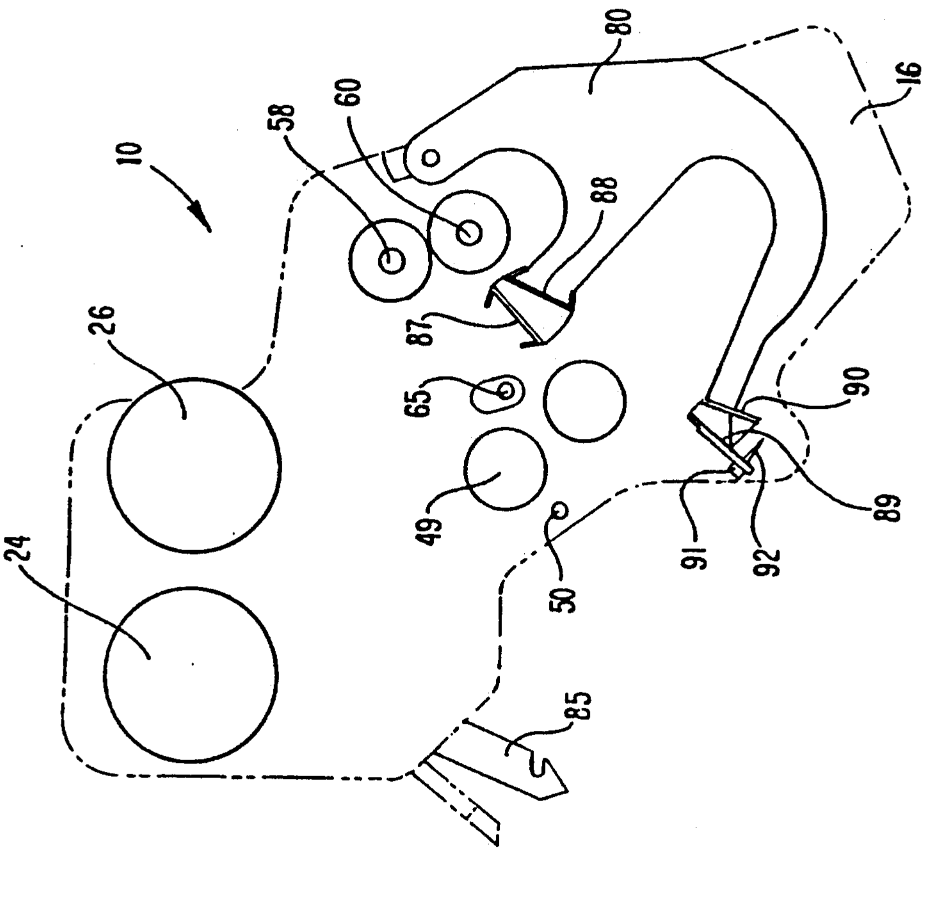

Operation of the unit 10 is initiated when paper 93 (FIG. 11) enters transfer unit 10 in the direction of the arrow 94 (FIG. 10). The presence of paper 93 will be sensed by sensor 90 which signals controller 300. In response controller 300 will send signals to motors 38 and 77 which will be energized (FIG. 14). Motor 77 will produce a short rotation of blocks 71, 72 via drive shaft 76 and axle 73. Axle 73 will be rotated clockwise as shown in FIG. 13. The short clockwise movement of axle 73 will be sufficient to cause the arms 68 and 69 to move over dead center permitting the tension in springs 66 and 67 to pull the end of lever 45 and 62 upwards. As the levers 62 and 45 are pulled upwards, they will pull on the respective arms 68 and 69 which in turn will rotate the drive shaft 76 of motor 77 via the axle 73. The motor 77, which is now deenergized, will cause some braking resistance against the pulls of springs 66, 67. Thus, the levers 45 and 62 will move gently in the upward direction so that there will be a gentle mating of pressure roller 61 against heater roller 49. Simultaneously, roller 49 will be rotated counter-clockwise, as shown in FIG. 11, by motor 31 via belt 47 (FIG. 5). The motion of arm 69 also deactivates brake mechanism 102, which permits the rotation of foil supply roller 24 so that transfer sheet 30 can be fed between heat and pressure rollers 49 and 61 to foil take-up roller 26. The motor 31 will also drive take-up roller 29 directly, and pull roller 58 via belt 56. Rotation of roller 26 causes the transfer sheet 30 to be pulled off the foil supply roller 24. To insure that the rollers 49 and 61 come together and that machine vibrations are minimized, the levers 45 and 62 are slotted at their ends so that momentum of the moving parts including the motor 77 may be dissipated without impulsing the roller 61. The spacing roller 65 will move upwardly to permit the sheet 30 to move into engagement with the heater roller 49.

As seen in FIG. 11, the incoming paper 93 will be guided by plates 89, 90 between rollers 49, 61. The paper 93 will be squeezed between the moving sheet 30 and the rotating pressure roller 61. The heat and pressure of rollers 49, 61 will cause the transfer of a transferrable layer from sheet 30 onto the heated indicia on paper 93 in a known manner. The newly coated sheet 93 will be guided by plates 87, 88 into engagement with rollers 58, 60 which will eject the coated paper 93 into an output tray or the like (not shown). The unit 10 will continue to feed transfer sheet 30 between rollers 49, 61 and will continue to maintain pressure as long as there is a continuous feed of paper 93. However, if the arm 92 should cease to be deflected as shown in FIG. 11, the motor 38 will be deenergized and the motor 77 will be energized to rotate axle 73 in the counter-clockwise direction as viewed in FIG. 13. As a result, the arms 69, 68 will pull the levers 45, 62 down against the tension of springs 66, 67, respectively. The arms 69, 68 will assume the over-the-center position as shown in the solid line of FIG. 13. The brake mechanism 102 will stop rotation of the foil supply roller 24, the pressure roller 61 will move away from roller 49 and roller 65 will move down, pulling the transfer sheet 30 away from the hot surface of roller 49. In order to facilitate easy loading of the sheet 30, the plates 87–90 can be moved from their operative positions (FIGS. 10, 11) into the loading position shown in FIG. 12.

Figure 19:
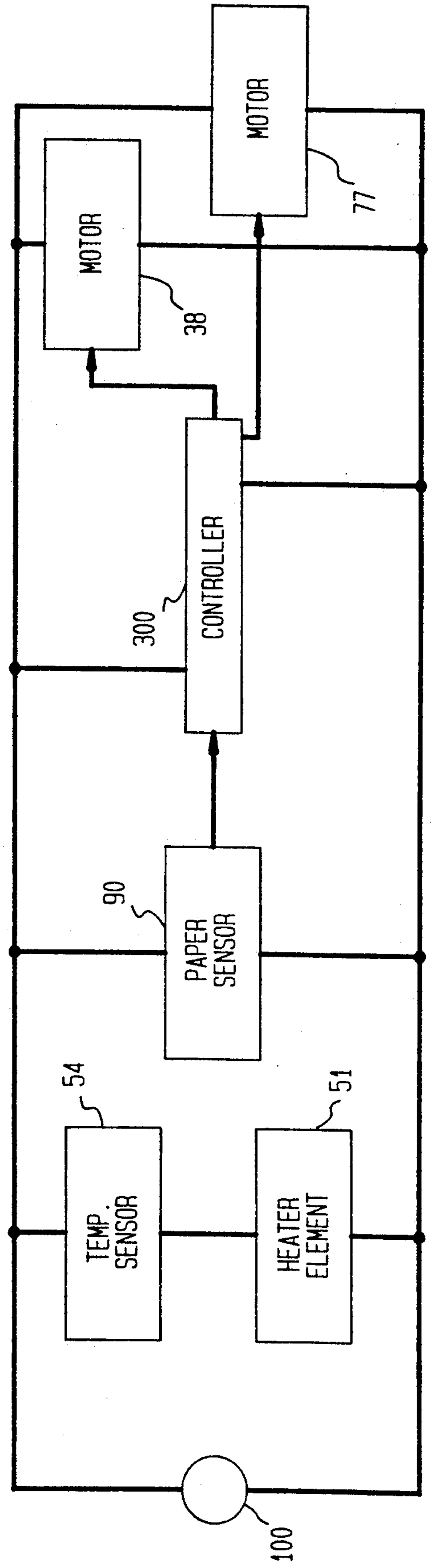
FIG. 19 is an electrical block diagram of the controller of the present invention.
Figure 20A:
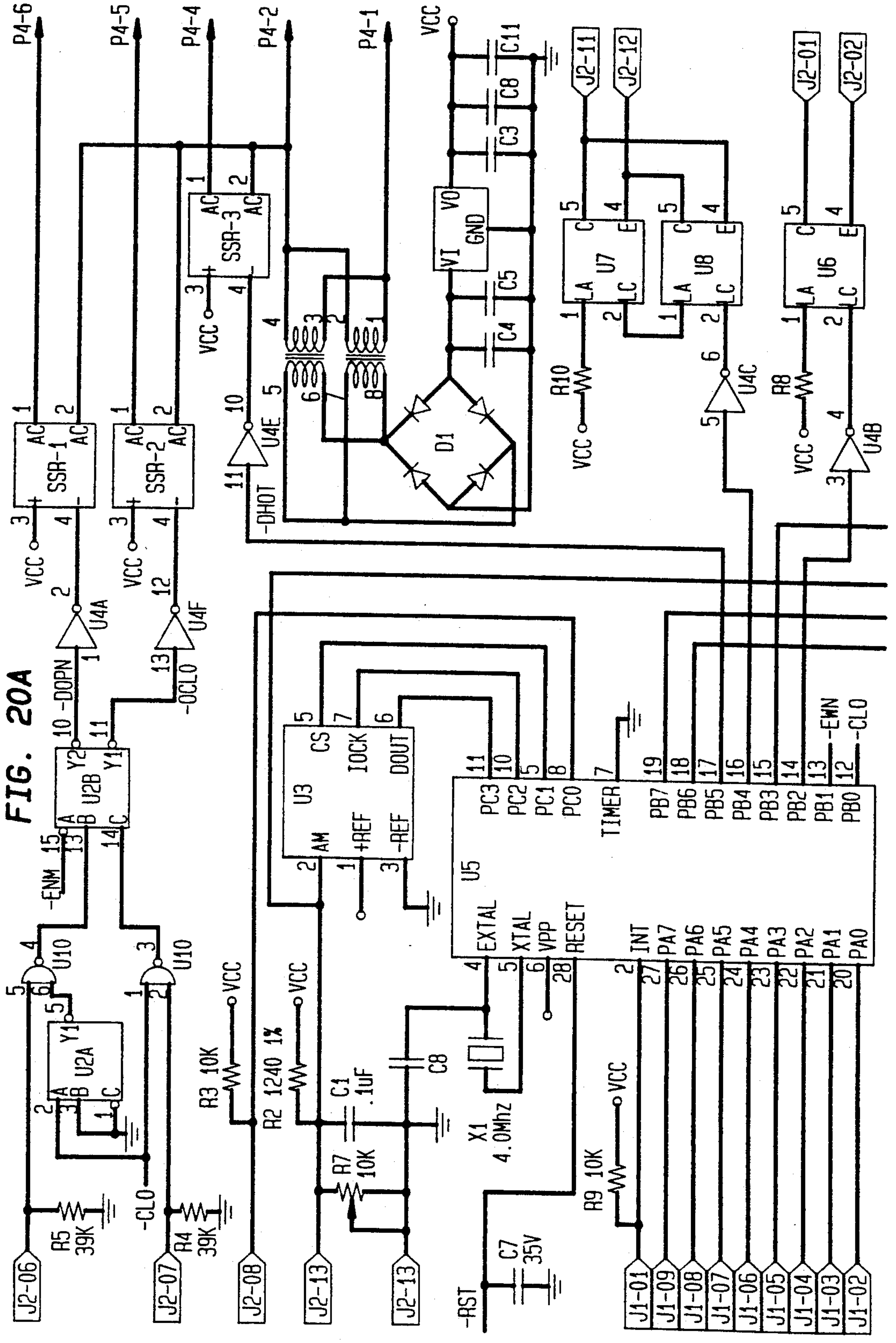
FIGS. 20, 20A and 20B are schematic diagrams illustrating the circuits in the controller.
Figures 20, 20A, 20B:
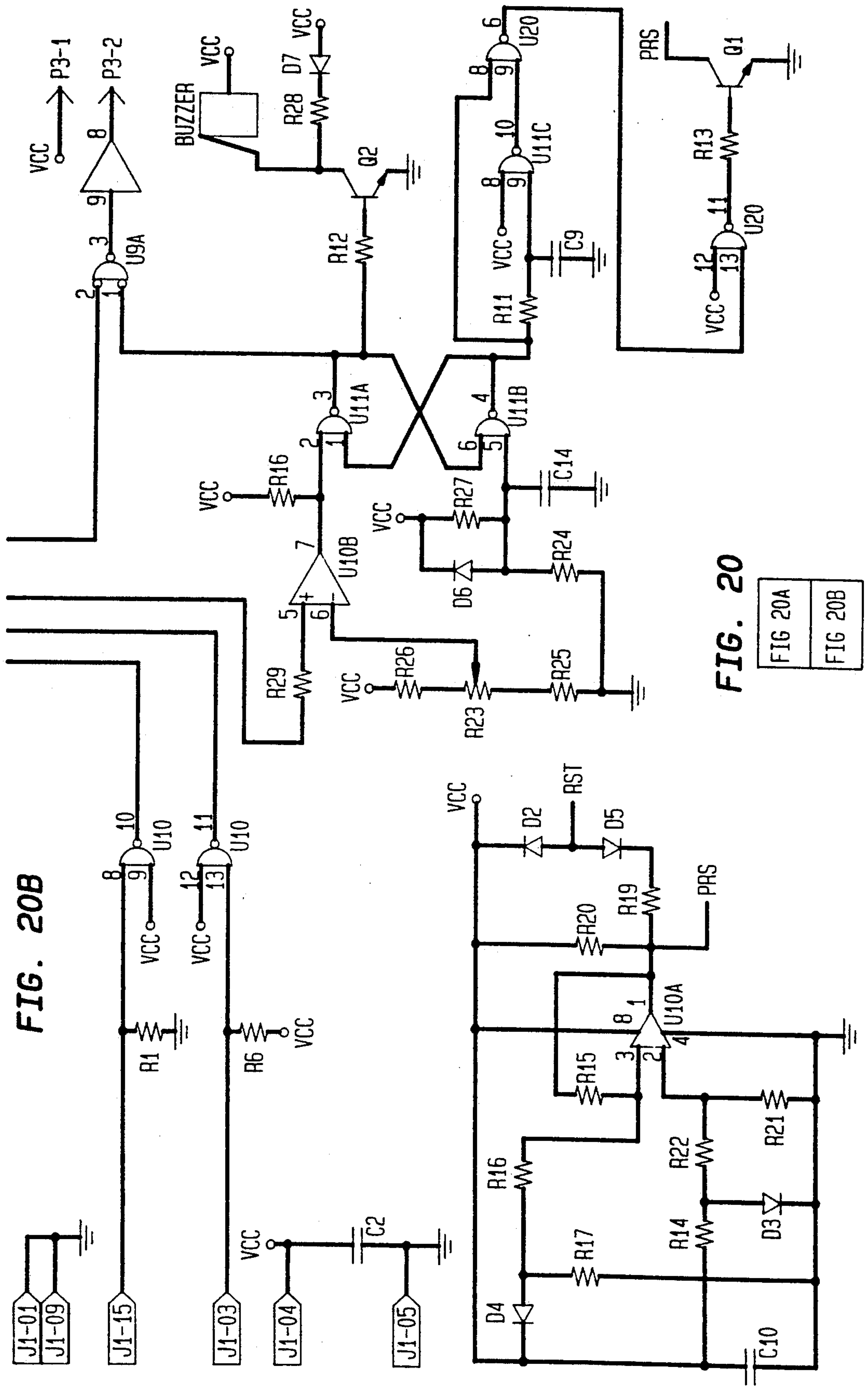

The block diagram of FIG. 19 illustrates an electrical 15 control network for operating the unit 10. The circuit for implementing the controller 300 is connected to a conventional data cable jack 97 and signal cable jack 99 (FIG. 5) that is fixed to plate 14. The controller 300 is electrically linked to scanner interface with which controller communicates. The scanner interface is substantially as described in U.S. Pat. Nos. 4,760,467 and 4,866,539. Prior to the commencement of the foil transfer process described above, data indicating foil temperature and the length of portion of transfer sheet 30 are sent from the scanner interface to controller 300. This data is stored in the memory of controller 300. The data received by controller 300 sets up conditions and parameters in the transfer unit 10 for a particular print run. The controller 300 activates and deactivates the various components of the transfer unit 10 in accordance with a ROM resident program and the data it receives from the scanner interface. An understanding of the details of the ROM resident program is not necessary for an understanding of the invention as a whole. The electronic circuitry associated with the invention is shown in FIGS. 20 A & B. All of the electronic components shown in FIGS. 20 A & B are standard. The controller unit 300 is programmed with parameters of time and temperature which may vary according to the type of foil used. The operator selects the foil to be used. When the sheet to be printed enters the transfer unit 10 and activates sensor 90, controller 300 sends out signals to the transfer unit 10 which control the sequence and duration of the operations described above as well as the temperature of heater roller 49, dependent on the type of foil being used. The controller 300 also regulates the temperature of heater roller 49 so that when no paper is present it is kept at a substantially constant temperature in readiness for the printing process. As part of a safety feature to prevent overheating of heater roller 49 in the event of a malfunction of the temperature controller 300, a secondary monitoring circuit including detector 54 will switch the heater elements 51 off if the temperature exceeds 185° F., sound a warning buzzer, and display an error signal on the printer display panel to prevent further printing until the temperature returns to the pre-set limit. When the machine has not been used for approximately 20 minutes the normal operating temperature is reduced to and maintained at 100° F. until printing resumes. The controller 300 is self contained, comprising a logic board, including a microprocessor, read-only memory and random access memory modules, control relays and a power supply. Controller 300 contains software which controls the operation of unit 10. The major elements which comprise the electronics of the invention including controller 300 are listed in the parts list below.

PARTS LIST FOR CONTROLLER 300

| Quality | Reference | Part |
|---|---|---|
| 1 | U1 | 68705P3S |
| 1 | U2 | TLC549 |
| 3 | U7,U8,U9 | 4N35 |
| 1 | X1 | 4.0 MHZ |
| 1 | C1 | 22pf |
| 3 | D1,D4,D6 | 1N914 |
| 2 | R1,R3 | 10K |
| 7 | C2,C3,C7,C8,C9,C11,C12 | .1uF |
| 1 | U10 | 4093 |
| 1 | U4 | 7407 |
| 1 | R15 | 180 |
| 1 | R16 | 100 |
| 1 | D3 | BRIDGE DK PN RB-153 |
| 1 | VR2 | 7805 |
| 1 | U11 | LM393N |
| 1 | R20 | 68 |
| 1 | R19 | 47K |
| 3 | R21,R18,R23 | 1K |
| 1 | R22 | 2K |
| 1 | R17 | 6.8K |
| 1 | D5 | 1N5229B |
| 1 | R24 | 39K |
| 1 | R2 | 1240 1% |
| 1 | C10 | 1uF 35V DK PN P2059 |
| 1 | C5 | 4700 16V DK PN P5037 |
| 1 | U3 | 74LS139 |
| 1 | J1 | DB15-P JDR DB15PR |
| 1 | J2 | DB15-S JDF DB15SR |
| 1 | (U1) 28 PIN ST SOCKET | NEWARK |
| 1 | P3 | 2 PI .156 CONN DK PN WM4600 |
| 1 | P4 | 6 PIN .156" DK PN WM4604 |
| 1 | T1 | SIGNAL PN LP16-700 |
| 3 | SSR1,2,3 | CRYDOM D2W202F NEWARK 81F4904 |
| 1 | 28 | SOCKET |
| 8 | 8 | SOCKET |
| 2 | 14 | SOCKET |
| 2 | 16 | SOCKET |
| 2 | R1,R3 | 1K |
| 1 | R2 | 100K |
| 3 | R7,R8,R9 | 10K |
| 1 | R4 | 5KPOT |
| 1 | R5 | 470Ω |
| 1 | R6 | 6.8K |
| 1 | R10 | 330Ω |
| 1 | D1 | 1N914 |
| 1 | C1 | 1uF |

-continued

PARTS LIST FOR CONTROLLER 300

| Quality | Reference | Part |
|---|---|---|
| 1 | C2 | .1uF |
| 1 | C3 | 4.7uF |
| 1 | U1 | 4093 |
| 1 | U2 | 74HC32 |
| 1 | Q1,Q2 | P2N222 |

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A foil transfer unit for transferring foil onto a substrate comprising:
   - a frame;
   - a foil supply means mounted on said frame for holding a transfer sheet;
   - a heated roller means mounted on said frame;
   - a pressure roller means;
   - a lever means, supporting said pressure roller means, for moving said pressure roller means between an active position where said pressure roller means presses against said heated roller means and a ready position where said pressure roller means is spaced from said heated roller means;
   - a foil take-up means including first drive means for moving said transfer sheet from said foil supply means, between said heated roller means and said pressure roller means and onto said take-up means;
   - resilient means for biasing said lever means;
   - arm means having a slot therein, said arm means being slidably coupled to said lever means in said slot;
   - an axle;
   - a block coupled to said axle and said arm means; and
   - second drive means for rotating said block via said axle, said block rotating said arm means in a clockwise direction for moving said lever into said active position and rotating said arm means in a counterclockwise direction for moving said lever into said ready position so that said slot slidably moves along said lever means permitting said resilient means to move said lever in an upward direction for gently moving said pressure roller means between said ready position and said active position, said lever means being coupled at an end in said slot in said ready position and said lever means moves from said end of said slot in said ready position to dead center in said slot in said active position.

2. The unit of claim 1 further including brake means controlled by said lever means for preventing movement of said foil supply means when said pressure roller is in said ready position.

3. The unit of claim 2 further including torque adjustment means for adjusting the torque imparted to said heater roller means, said supply roller means and said take-up roller means.

4. The unit of claim 3 further including detector means for detecting whether said unit is in said active position or said ready position.

5. The unit of claim 4 further including substrate input sensing means which activates said unit when said substrate enters said unit.

6. The unit of claim 5 further including guide means for guiding said substrate between said heater roller means and said pressure roller means.

7. The unit of claim 6 wherein said substrate input sensing means is carried by guide means.

8. The unit of claim 7 further including foil detecting means for detecting the presence of said foil on said foil supply means.

9. The unit of claim 8 further including driven removal means for removing said substrate from said unit after said foil has been transferred onto said substrate.

10. The unit of claim 9 further comprising additional torque adjustment means for adjusting the torque imparted to said driven removal means.

11. The unit of claim 10 further including coupling means for coupling said unit to the output of a printing means.

12. The unit of claim 11 further comprising a heater roller overheating prevention means for monitoring the temperature of said heater roller means and reducing said temperature if said heater roller means remains at a predetermined elevated temperature for a predetermined period of time.

13. The unit of claim 12 wherein said foil supply means includes a foil roll spindle means for mounting a roll of foil and said foil detecting means includes a timing wheel having index markings on the rim thereof and a photoelectric means for detecting said index markings,
   - wherein when said photoelectric means ceases to detect the movement of said index markings, said foil detecting means produces a signal indicating that said unit has run out of foil.

14. The unit of claim 13 wherein said substrate input sensing means comprises:
   - a light beam source;
   - a light beam detecting means; and,
   - a pivotable arm suspended in a pendulum-like manner in the path of said substrate as it enters said unit,
   - wherein the entry of said substrate into said unit causes said arm to pivot into the path of said light beam thereby causing said light beam detecting means to signal the presence of said substrate entering said unit.

15. The unit of claim 14 wherein said guide means include a spring loaded pivotable guide bracket for guiding said substrate as it travels through said unit.

16. The unit of claim 2 wherein said brake means comprises a band attached to said lever means for selectively applying stopping friction to said foil supply means.

17. The unit of claim 2 wherein said brake means comprises a brake shoe attached to said lever means for selectively applying stopping friction to said foil supply means.

* * * * *